(12) United States Patent
Hakotani et al.

(10) Patent No.: US 6,245,419 B1
(45) Date of Patent: Jun. 12, 2001

(54) RESIN COMPOSITION HAVING EXCELLENT VIBRATION-DAMPING PROPERTIES AND MOLDED ARTICLE MADE THEREOF

(75) Inventors: Masahiro Hakotani; Koichi Akiyama; Takashi Shibata, all of Kamakura; Kaneo Hamajima, Anjyou, all of (JP); Osamu Kito, Brussels (BE); Hiroyuki Takahashi; Kazuhiro Uchida, both of Toyota (JP)

(73) Assignees: Takeda Chemical Industries, Ltd., Osaka; Toyota Jidosha Kabushiki Kaisha; Uchihamakasei Kabushiki Kaisha, both of Aichi, all of (JP)

( * ) Notice: Subject to any disclaimer, the term of this patent is extended or adjusted under 35 U.S.C. 154(b) by 0 days.

(21) Appl. No.: 09/390,767

(22) Filed: Sep. 7, 1999

(30) Foreign Application Priority Data

Sep. 7, 1998 (JP) .................................... 10-252447

(51) Int. Cl.⁷ ............................... B32B 7/00; C08F 20/00
(52) U.S. Cl. .......................... 428/221; 525/437; 525/444; 524/81
(58) Field of Search .................... 525/437, 444; 524/81; 428/221

(56) References Cited

U.S. PATENT DOCUMENTS

| | | | |
|---|---|---|---|
| 4,539,390 | 9/1985 | Jackson, Jr. et al. | 528/303 |
| 5,368,916 | * 11/1994 | Fujimoto et al. | 428/215 |
| 5,945,643 | * 8/1999 | Casser | 181/290 |

FOREIGN PATENT DOCUMENTS

| | | |
|---|---|---|
| 0 186 165 | 7/1986 | (EP) . |
| 0 197 618 | 10/1986 | (EP) . |
| 53-1480 | 1/1978 | (JP) . |
| 54-58784 | 5/1979 | (JP) . |
| 63-230719 | 9/1988 | (JP) . |
| 2-102212 | 4/1990 | (JP) . |
| 8-301998 | 11/1996 | (JP) . |

\* cited by examiner

*Primary Examiner*—Samuel A. Acquah
(74) *Attorney, Agent, or Firm*—Wenderoth, Lind & Ponack, L.L.P.

(57) ABSTRACT

An unsaturated polyester resin composition having excellent vibration-damping properties, comprising an unsaturated polyester resin (A) having a glass transition temperature (Tg) of 0° C. or more and less than 60° C. In the composition, the unsaturated polyester resin (A) may be blended with an unsaturated polyester resin (B) having a glass transition temperature (Tg) of 150° C. or more and less than 200° C. or an unsaturated polyester resin (C) having a glass transition temperature (Tg) of 200° C. or more. Further, the composition may contain an elastomer (D) having a glass transition temperature (Tg) of −50° C. or more and less than 100° C. Since the unsaturated polyester resin composition has excellent vibration-damping properties and moldability in a wide temperature range, it is very useful to provide molded articles such as vibration-damping structural components, especially automobile engine-related components, having excellent heat resistance and chemical resistance as well as having excellent vibration-damping properties and moldability.

16 Claims, 5 Drawing Sheets

RESIN COMPOSITION HAVING EXCELLENT VIBRATION-DAMPING PROPERTIES AND MOLDED ARTICLE MADE THEREOF

BACKGROUND OF THE INVENTION

1. Field of the Invention

The present invention relates to a vibration-damping resin composition and to a molded article such as a vibration-damping structural component obtained by molding it.

2. Description of the Prior Art

A fiber-reinforced plastic (FRP) using an unsaturated polyester resin has excellent mechanical strength, heat resistance, water resistance, and chemical resistance as well as high productivity and is used in housing appliances such as a bath tub and a washing bowl and in addition in automobile fields as a material for outer plies and cladding components. Recently, an unsaturated polyester sheet molding compound (hereafter, abbreviated as SMC) or a bulk molding compound (hereafter, abbreviated as BMC) has been paid much attention as a plastic material for automobile engine-related components, and has come to be used also for structural components that are required to have high heat resistance and chemical resistance, for example, cylinder head covers, oil pans, etc.

Conventionally, SMC or BMC or the like used for automobile engine-related components have been required of particularly heat resistance and chemical resistance. Recently, vibration-damping properties have been required keenly for the purpose of sound insulation. As a means for imparting vibration-damping properties, there have been proposed a method of decreasing the content of a filler or glass fiber in a molding material, and in addition, a method of adding a block copolymer that imparts vibration-damping properties as described in Japanese Patent Application Laid-open No. 2-102212, and a method of using a resin having a glass transition temperature of 60 to 120° C. as described in Japanese Patent Application Laid-open No. 8-301998.

However, the method of decreasing the content of a filler or glass fiber gives a great influence on the mechanical properties of the construction and finds a limitation in its use. Further, the method of adding a vibration damper such as a block copolymer leads to a decrease in mechanical properties or moldability although it can improve vibration damping properties by increasing the proportion of the vibration damper, so that it is difficult to obtain sufficient vibration-damping properties while ensuring sufficient moldability. Further, in the case of Japanese Patent Application Laid-open No. 8-301998, sufficient vibration-damping properties cannot be obtained particularly in low temperature regions as low as 60° C. or less.

SUMMARY OF THE INVENTION

Under such circumstances, an object of the present invention is to provide a resin composition exhibiting excellent vibration-damping properties in a use temperature region (for example, 0 to 100° C.) of automobile engine-related components and a molded article made thereof.

The present inventors have made extensive research on molding materials having heat resistance, chemical resistance, and moldability and having excellent vibration-damping properties in a temperature range of 0 to 100° C. or broader than it, and as a result, they have found the followings.

(I) An unsaturated polyester resin having a glass transition temperature of 0° C. or more and less than 60° C. (hereafter, referred to as "unsaturated polyester resin (A)") has excellent vibration-damping properties in a room temperature range to a high temperature range, but the unsaturated polyester resin (A) has some problem in moldability.

(II) However, blending the unsaturated polyester resin (A) with another unsaturated polyester resin having good moldability gives improved moldability coupled with excellent vibration-damping properties.

(III) In particular, an unsaturated polyester resin composition comprising a blend of 10% by weight or more and less than 90% by weight, preferably 30% by weight or more and less than 80% by weight, more preferably 40% by weight or more and less than 60% by weight, based on the total weight of unsaturated polyesters, of the unsaturated polyester resin (A); and 10% by weight or more and less than 90% by weight, preferably 20% by weight or more and less than 70% by weight, more preferably 40% by weight or more and less than 60% by weight, based on the total weight of unsaturated polyesters, of an unsaturated polyester resin having a glass transition temperature of 150° C. or more and less than 200° C. (hereafter, referred to as "unsaturated polyester resin (B)") is excellent in both vibrationdamping properties and moldability in a room temperature range to a high temperature range.

(IV) Also, an unsaturated polyester resin composition comprising a blend of 10% by weight or more and less than 95% by weight, preferably 40% by weight or more and less than 80% by weight, more preferably 50% by weight or more and less than 80% by weight, based on the total weight of unsaturated polyesters, of the unsaturated polyester resin (A); and 5% by weight or more and less than 90% by weight, preferably 20% by weight or more and less than 60% by weight, more preferably 20% by weight or more and less than 50% by weight, based on the total weight of unsaturated polyesters, of an unsaturated polyester resin having a glass transition temperature of 200° C. or more (hereafter, referred to as "unsaturated polyester resin (C)") is excellent in both vibration-damping properties and moldability in a room temperature range to a high temperature range.

(V) Further, an unsaturated polyester resin composition comprising a blend of the unsaturated polyester resin (A), the unsaturated polyester resin (B) or the unsaturated polyester resin (C), and 3 to 30% by weight, preferably 5 to 20% by weight, more preferably 5 to 15% by weight a solid part of an elastomer having a glass transition temperature of −50° C. or more and less than 100° C. (hereafter, referred to as "elastomer (D)") has excellent vibration-damping properties and moldability from low temperature range around 0° C., the percentages by weight being based on the total weight of a mixture of unsaturated polyester resins, elastomers and vinyl monomers contained in the composition.

(VI) Further, the glass transition temperature of the above-mentioned elastomer (D) is preferably −20° C. or more and less than 80° C., more preferably 0° C. or more and less than 50° C.

Based on these findings, intensive investigation has been made and adjustment of the glass transition temperature and proportion of the unsaturated polyester resins has led to the achievement of the present invention of a structural resin composition having an advantageous combination of properties of heat resistance, chemical resistance, moldability and vibration-damping properties over a wide temperature range.

Therefore, the present invention relates to:

(1) an unsaturated polyester resin composition having excellent vibration-damping properties, comprising an unsaturated polyester resin (A) having a glass transition temperature (Tg) of 0° C. or more and less than 60° C.;

(2) an unsaturated polyester resin composition having excellent vibration-damping properties and moldability, comprising an unsaturated polyester resin (A) having a glass transition temperature (Tg) of 0° C. or more and less than 60° C., and an unsaturated polyester resin (B) having a glass transition temperature (Tg) of 150° C. or more and less than 200° C., wherein said composition comprises 10% by weight or more and less than 90% by weight of unsaturated polyesters (a) of the unsaturated polyester resin (A) and 10% by weight or more and less than 90% by weight of unsaturated polyesters (b) of the unsaturated polyester resin (B), based on the total weight of unsaturated polyesters (a) and (b) of the unsaturated polyester resins (A) and (B), and wherein said composition optionally contains a vinyl monomer as a diluent;

(3) an unsaturated polyester resin composition having excellent vibration-damping properties and moldability, comprising an unsaturated polyester resin (A) having a glass transition temperature (Tg) of 0° C. or more and less than 60° C., and an unsaturated polyester resin (C) having a glass transition temperature (Tg) of 200° C. or more, wherein said composition comprises 10% by weight or more and less than 95% by weight of unsaturated polyesters (a) of the unsaturated polyester resin (A) and 5% by weight or more and less than 90% by weight of unsaturated polyesters (c) of the unsaturated polyester resin (C), based on the total weight of unsaturated polyesters (a) and (c) of the unsaturated polyester resins (A) and (C), and wherein said composition optionally contains a vinyl monomer as a diluent;

(4) an unsaturated polyester resin composition having excellent vibration-damping properties and moldability, comprising in the unsaturated polyester resin composition of (2) above, 3 to 30% by weight a solid part of an elastomer (D) having a glass transition temperature (Tg) of −50° C. or more and less than 100° C., the percentage by weight being based on the total weight of a mixture of unsaturated polyester resins, elastomers, and vinyl monomers;

(5) an unsaturated polyester resin composition having excellent vibration-damping properties and moldability, comprising in the unsaturated polyester resin composition of (3) above, 3 to 30% by weight a solid part of the elastomer (D) having a glass transition temperature (Tg) of −50° C. or more and less than 100° C., the percentage by weight being, based on the total weight of a mixture of unsaturated polyester resins, elastomers, and vinyl monomers;

(6) an unsaturated polyester resin composition having excellent vibration-damping properties and moldability, in which the proportion of the unsaturated polyester resin (A) shown in (4) above is 10% by weight or more and less than 90% by weight, preferably 30% by weight or more and less than 80% by weight, more preferably 40% by weight or more and less than 60% by weight, based on the total weight of unsaturated polyesters;

(7) an unsaturated polyester resin composition having excellent vibration-damping properties and moldability, in which the proportion of the unsaturated polyester resins (A) shown in (5) above is 10% by weight or more and less than 95% by weight, preferably 40% by weight or more and less than 80% by weight, more preferably 50% by weight or more and less than 80% by weight, based on the total weight of unsaturated polyesters;

(8) an unsaturated polyester resin composition having excellent vibration-damping properties and moldability, comprising 30 to 95% by weight of the resin composition (unsaturated polyester resin composition X) containing the unsaturated polyesters or further the elastomer as described in any one of (1) to (7) above, 0 to 80% by weight of an inorganic filler, and 5 to 70% by weight of reinforcing fibers; and (9) a molded article obtained by molding the unsaturated polyester resin composition described in any one of (1) to (8) above.

In the above compositions, the percentage of each unsaturated polyester is expressed by % by weight based on the total weight of all the unsaturated polyesters contained in the respective compositions and the weight of vinyl polymers is not included. Further, the glass transition temperature (Tg) was obtained as a temperature at which the loss tangent (tanδ) in a dynamic viscoelasticity measurement was maximum.

DETAILED DESCRIPTION OF THE PREFERRED EMBODIMENTS

Figure 1:
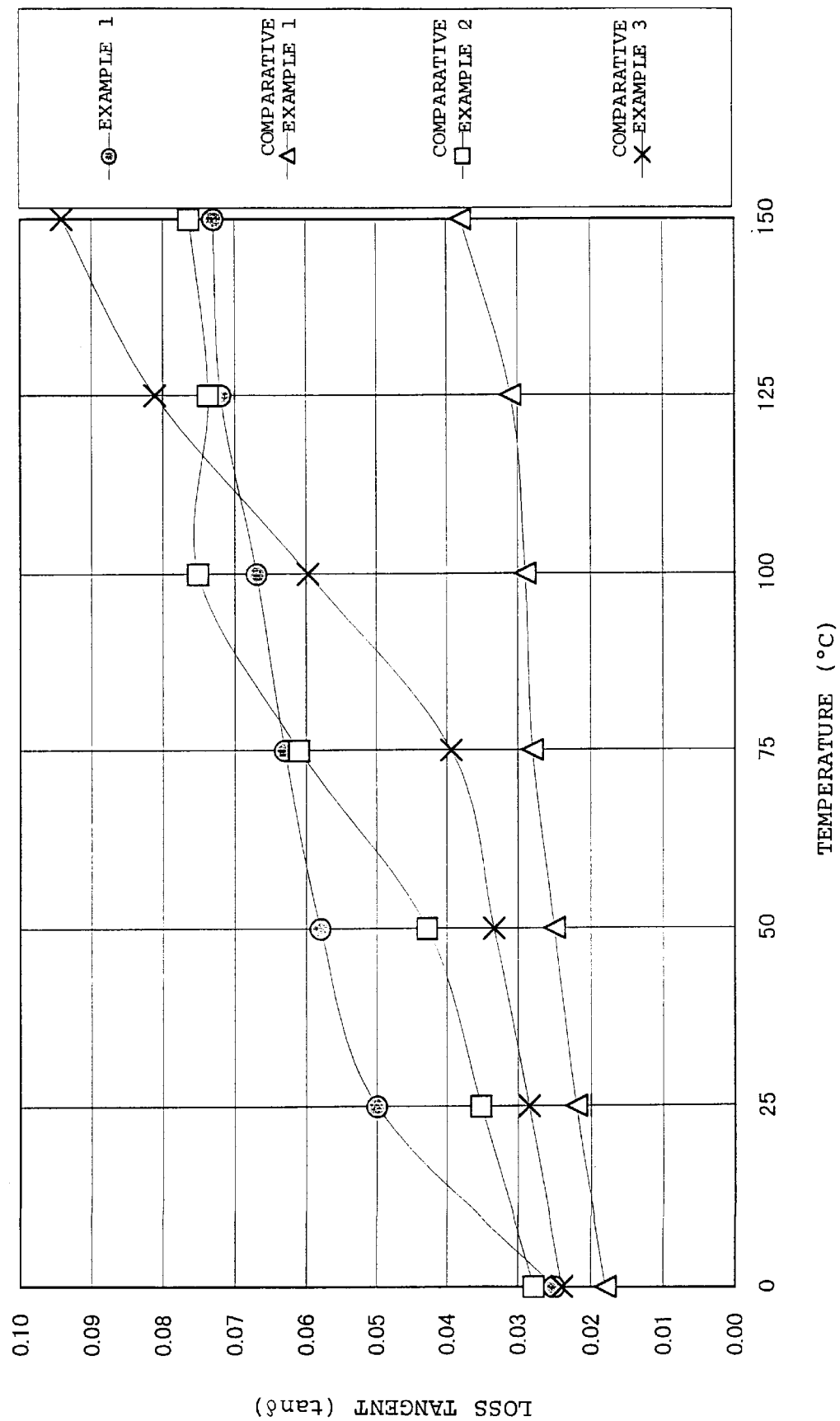
FIG. 1 is a drawing illustrating the effect on vibration-damping properties of blending an unsaturated polyester resin (A) having a low glass transition temperature.

The resin composition of the present invention is excellent in heat resistance and chemical resistance and has sufficient vibration-damping properties in a broad temperature range, for example, from 0 to 100° C. and hence exhibits high sound-proofing properties around engine immediately after the starting and during running in winter so that it is particularly effective for use in automotive engine-related components.

The unsaturated polyester used in the present invention is one that is synthesized by condensation between an α,β-olefine type unsaturated dicarboxylic acid and a dihydric glycol. In the synthesis of the polyester, there may be used in addition to the two components, saturated dicarboxylic acids, aromatic dicarboxylic acids, or dicyclopentadiene that reacts with dicarboxylic acids. Examples of the α,β-olefine type unsaturated dicarboxylic acid include, for example, maleic acid, fumaric acid, itaconic acid, citraconic acid, and anhydrides of these dicarboxylic acids. Examples of the dicarboxylic acid that are used in combination with the α,β-olefine type unsaturated dicarboxylic acid include, for example, adipic acid, sebacic acid, succinic acid, gluconic acid, phthalic anhydride, o-phthalic acid, isophthalic acid, terephthalic acid, tetrahydrophthalic acid, tetrachlorophthalic acid, etc. The dihydric glycol includes, for example, alkanediols, oxaalkanediols, diols obtained by addition of an alkylene oxide such as ethylene oxide or propylene oxide to bisphenol A, etc. In addition thereto, monools or trivalent triols may also be used. Examples of the alkanediol include, for example, ethylene glycol, 1,2-propylene glycol, 1,3-propylene glycol, 1,3-butanediol, 1,4-butanediol, neopentyl glycol, 1,5-pentanediol, 1,6-hexanediol, cyclohexanediol, etc. The oxaalkanediols include, for example, dioxyethylene glycol, triethylene glycol, etc. The monohydric or trihydric alcohol used in combination with these glycols includes, for example, octyl alcohol, oleyl alcohol, trimethylolpropane, etc. The synthesis of unsaturated polyester is carried out generally under heating, and the reaction is proceeded with removing by-produced water. Generally, the glass transition temperature of unsaturated polyester can be adjusted to be lowered by decreasing crosslinking density and reactivity by selecting raw materials to be used and by using such raw materials as having a long chain molecular structure, for example, adipic acid or sebacic acid for the saturated acid and diethylene glycol or propylene glycol for the glycol. On the contrary, by increasing the crosslinking density and reactivity and using as the material to be used raw materials having a rigid structure such as hydrogenated bisphenol A for the glycol, the glass transition temperature can be increased.

The vinyl monomer used in the present invention includes monovinyl monomers that have heretofore been used commonly as a diluent or crosslinking agent for unsaturated polyesters, for example, aromatic monovinyl monomers such as styrene, p-chlorostyrene, and vinyltoluene, acrylic monovinyl monomers such as acrylic acid, methyl acrylate, methacrylic acid, methyl methacrylate, and acrylonitrile, with styrene being particularly preferred. The vinyl monomers are blended in unsaturated polyesters and thermoplastic resins as a diluent for the unsaturated polyesters and thermoplastic resins, and in the present invention, they are used also as a diluent for elastomers.

For the elastomer used in the present invention, the glass transition temperature is important but the resin structure is not limited particularly. It is sufficient for the resin structure to have the glass transition temperature (Tg) obtained as a temperature at which the loss tangent (tanδ) by dynamic viscoelasticity measurement is maximum in a predetermined temperature range. The glass transition temperature (Tg) of elastomer is −50° C. or more and less than 100° C., preferably −20° C. more and less than 80° C., more preferably 0° C. or more and less than 50° C. The resin structure having a glass transition temperature within the predetermined temperature range includes rubber based polymers, vinyl acetate based polymers, acrylic based polymers, saturated polyesters, etc.

The rubber based polymers include block copolymers, random copolymers and their hydrogenated products of a vinyl monomer whose homopolymer has a glass transition temperature (Tg) of 50° C. or more (for example, styrene) and a compound having a diene skeleton whose homopolymer has a glass transition temperature (Tg) of 0° C. or less (for example, butadiene and isoprene). Preferably, there are tri-block copolymers of polystyrene and vinyl-polyisoprene bonded thereto and copolymers of styrene and butadiene, etc. In addition thereto, other vinyl compounds may also be used in combination.

The polyvinyl acetate based polymers include homopolymer of vinyl acetate or its product obtained by modification with (meth)acrylic acid, etc., and in addition, random or block copolymers with acrylic based compounds represented by methyl (meth)acrylate, ethyl (meth)acrylate, butyl (meth)acrylate, etc. or vinyl monomers (for example, styrene).

The acrylic based polymer may be any polymer so long as it has a resin structure whose glass transition temperature is within a predetermined temperature range. For example, there can be used polymers of ethyl (meth)acrylate or butyl (meth)acrylate having relatively low glass transition temperatures and polymers obtained by copolymerization of such with methyl methacrylate or the like having a high glass transition temperature.

Any saturated polyesters may be used so long as it has a resin structure whose glass transition temperature is within a predetermined temperature range. For example, it includes adipic acid or sebacic acid as a low glass transition temperature component for the saturated acid and orthophthalic acid, isophthalic acid, or paraphthalic acid as a component having a high glass transition temperature and ethylene glycol, propylene glycol, diethylene glycol for the glycol or the like as raw materials.

The unsaturated polyester resin composition of the present invention gives a composition exhibiting excellent heat resistance, chemical resistance and moldability as well as having excellent vibration-damping properties by blending the unsaturated polyester resins (A) to (C) and, if necessary, further the elastomer (D), in combination as mentioned above.

Among the above-mentioned compositions, resin compositions obtained by blending the unsaturated polyester resin (A) with the unsaturated polyester resin (B) or the unsaturated polyester resin (C) are preferred and more preferred are resin compositions obtained by further blending them with the elastomer (D) and the vinyl monomer.

The unsaturated polyester resin composition of the present invention may, if desired, be blended with general additives such as fillers, curing agents, curing adjusters, pigments, thickening agents, other than those described above. The filler includes calcium carbonate, aluminum hydroxide, etc. The curing agent includes peroxy esters represented by t-butyl peroxybenzoate and t-butyl peroxyoctoate, peroxy ketals represented by 1,1-bis(t-butylperoxy)3,3,5-trimethylcyclohexane, peroxycarbonates represented by t-butyl peroxyisopropyl carbonate, etc., and at least one of them is used in amounts of 0.5 to 5 parts by weight, preferably 1 to 3 parts by weight per 100 parts by weight of a mixture of (A) to (D) and vinyl monomer. The curing adjuster includes parabenzoquinone, t-butylcatechol, etc. The pigment includes, for example, carbon black, titanium oxide, iron oxide red, copper phthalocyanine blue, etc. The thickening agent includes oxides or hydroxides of magnesium, calcium, etc. Further, the unsaturated polyester resin composition of the present invention may be blended with low shrinking agents for general unsaturated polyesters for the purpose of low shrinking of molded articles. The low shrinking agent includes polystyrene, saturated polyester (molecular weight: 3,000 to 10,000), polymethyl methacrylate, polyvinyl acetate, polyether, etc.

The resin compositions blended with such various additives may be converted to SMC or BMC by having glass fiber (for example, 8 to 20 μm in diameter and ½ to 4 inches in length) impregnated therein using conventional means and apparatus. The glass fiber is blended usually in an amount of about 5 to 60% by weight, based on the total weight of the composition. The SMC and BMC of the present invention may be cured by heat-press in a mold (pressure: 5 to 12 MPa, temperature: 70 to 180° C.) to produce a molded article.

Hereafter, the present invention will be explained more specifically by specific examples.

SYNTHESIS EXAMPLES

Hereafter, synthetic examples for the unsaturated polyester resins used in examples will be shown.

(1) Synthesis of Unsaturated Polyester Resin (A)

2,910 g of Diethylene glycol, 500 g of fumaric acid, 1,050 g of adipic acid, and 2,429 g of isophthalic acid were reacted by a conventional method at 200° C. to an acid value of 15 to prepare an unsaturated polyester, which was mixed with 70 parts by weight of styrene per 100 parts by weight of the ester to obtain the unsaturated polyester resin (A).

(2) Synthesis of Unsaturated Polyester Resin (B)

After 5,010 g of propylene glycol and 6,250 g of isophthalic acid were subjected to a primary reaction by a conventional method at a temperature of 200° C. to an acid value of 15, 2,320 g of propylene glycol and 5,530 g of maleic anhydride were added and secondary reaction was performed by a conventional method at a reaction temperature of 200° C. to an acid value of 20 to prepare an unsaturated polyester, which was mixed with 70 parts by weight of styrene per 100 parts by weight of the ester to obtain the unsaturated polyester resin (B).

(3) Synthesis of Unsaturated Polyester Resin (C)

1,480 g of Propylene glycol, 2,000 g of hydrogenated bisphenol A, and 2,590 g of maleic anhydride were reacted by a conventional method at 200° C. to an acid value of 25 to prepare an unsaturated polyester, which was mixed with 70 parts by weight of styrene per 100 parts by weight of the ester to obtain the unsaturated polyester resin (C).

(4) Synthesis of Unsaturated Polyester Resin (E)

After 9,366 g of diethylene glycol, 8,500 g of isophthalic acid were subjected to primary reaction by a conventional method at 200° C. to an acid value of 15, 3,345 g of maleic anhydride was added and secondary reaction was performed to an acid value of 20 to prepare an unsaturated polyester, which was mixed with 70 parts by weight of styrene per 100 parts by weight of the ester to obtain the unsaturated polyester resin (E).

(5) Synthesis of Unsaturated Polyester Resin (F)

After 950 g of propylene glycol, 2,350 g of diethylene glycol, and 2,625 g of isophthalic acid were subjected to primary reaction by a conventional method at a reaction temperature of 200° C. to an acid value of 20, 1,825 g of fumaric acid was added and secondary reaction was performed to an acid value of 20 to prepare an unsaturated polyester, which was mixed with 70 parts by weight of styrene per 100 parts by weight of the ester to obtain the unsaturated polyester resin (F).

EXAMPLES 1–20, COMPARATIVE EXAMPLES 1–9

An SMC was prepared by a conventional method with each composition shown in Tables 1 to 3. In Tables, the glass transition temperature of a cast plate formed from each unsaturated polyester resin alone was shown. The glass transition temperatures shown here were obtained as temperatures at which the loss tangent (tanδ) obtained according to JIS K 7198 "Testing method for dynamic mechanical properties of plastics by non-resonant, forced, fixed frequency oscillation" was maximum. Each SMC was pressurized for a pressurized flow time of 9 seconds at a pressure of 10 MPa under the predetermined conditions to make a molded article of 300×300×3 mm.

The vibration-damping properties of the molded articles can be evaluated by the loss tangent (tanδ) obtained by the above-described measurement method. Tables 1 to 3 show the results of the measurements of loss tangent (tanδ) at respective temperatures.

TABLE 1

| | Example | | | | | | | | | |
|---|---|---|---|---|---|---|---|---|---|---|
| Resin Tg | Example 1 | Example 2 | Example 3 | Example 4 | Example 5 | Example 6 | Example 7 | Example 8 | Example 9 | Example 10 |
| (A) 50° C. | 60 | 60 | 16 | 24 | 32 | 40 | 48 | 56 | 64 | 72 |
| (E) 80° C. | | | | | | | | | | |
| (F) 100° C. | | | | | | | | | | |
| (B) 160° C. | | 40 | | | | | | | | |
| (C) 220° C. | 40 | | 64 | 56 | 48 | 40 | 32 | 24 | 16 | 8 |
| Elastomer (VS-1: solid) | | | 10 | 10 | 10 | 10 | 10 | 10 | 10 | 10 |
| Other elastomer (solid part) | | | | | | | | | | |
| PS | | | | | | | | | | |
| Styrene monomer | | | 10 | 10 | 10 | 10 | 10 | 10 | 10 | 10 |
| Filler | 120 | 120 | 120 | 120 | 120 | 120 | 120 | 120 | 120 | 120 |
| GF | 30 wt % | 30 wt % | 30 wt % | 30 wt % | 30 wt % | 30 wt % | 30 wt % | 30 wt % | 30 wt % | 30 wt % |
| 0 | 0.025 | 0.028 | 0.028 | 0.030 | 0.031 | 0.039 | 0.044 | 0.045 | 0.046 | 0.045 |
| 25 | 0.050 | 0.050 | 0.039 | 0.042 | 0.045 | 0.058 | 0.065 | 0.066 | 0.066 | 0.068 |
| 50 | 0.058 | 0.060 | 0.043 | 0.047 | 0.051 | 0.066 | 0.071 | 0.071 | 0.074 | 0.078 |
| 75 | 0.063 | 0.065 | 0.048 | 0.052 | 0.065 | 0.076 | 0.086 | 0.088 | 0.087 | 0.085 |
| 100 | 0.067 | 0.070 | 0.052 | 0.060 | 0.067 | 0.078 | 0.087 | 0.085 | 0.061 | 0.082 |
| 125 | 0.072 | 0.083 | 0.055 | 0.063 | 0.072 | 0.081 | 0.086 | 0.080 | 0.080 | 0.078 |
| 150 | 0.073 | 0.092 | 0.059 | 0.070 | 0.072 | 0.078 | 0.080 | 0.077 | 0.078 | 0.072 |
| Moldability* | ⊚ | ⊚ | ⊚ | ⊚ | ⊚ | ⊚ | ⊚ | ⊚ | ○ | ○ |

*Moldability:
⊚ Good moldability (Good appearance)
○ Moldable to a functional component

TABLE 2

| Resin Tg | Example 11 | Example 12 | Example 13 | Example 14 | Example 15 | Example 16 | Example 17 | Example 18 | Example 19 | Example 20 |
|---|---|---|---|---|---|---|---|---|---|---|
| (A) 50° C. | 16 | 24 | 32 | 40 | 48 | 56 | 64 | 48 | 48 | 48 |
| (E) 80° C. | | | | | | | | | | |
| (F) 100° C. | | | | | | | | | | |
| (B) 160° C. | 64 | 56 | 48 | 40 | 32 | 24 | 16 | | | |
| (C) 220° C. | | | | | | | | 32 | 32 | 32 |
| Elastomer (VS-1: solid) | 10 | 10 | 10 | 10 | 10 | 10 | 10 | | | |
| Other elastomer (solid part) | | | | | | | | | (PVAc)10 | (SP)10 |
| PS | | | | | | | | 10 | | |
| Styrene monomer | 10 | 10 | 10 | 10 | 10 | 10 | 10 | 10 | 10 | 10 |
| Filler | 120 | 120 | 120 | 120 | 120 | 120 | 120 | 120 | 120 | 120 |
| GF | 30 wt % | 30 wt % | 30 wt % | 30 wt % | 30 wt % | 30 wt % | 30 wt % | 30 wt % | 30 wt % | 30 wt % |
| 0 | 0.026 | 0.031 | 0.037 | 0.039 | 0.043 | 0.046 | 0.048 | 0.030 | 0.040 | 0.041 |
| 25 | 0.040 | 0.046 | 0.052 | 0.055 | 0.060 | 0.063 | 0.065 | 0.052 | 0.062 | 0.060 |
| 50 | 0.044 | 0.052 | 0.060 | 0.065 | 0.070 | 0.074 | 0.077 | 0.062 | 0.078 | 0.070 |
| 75 | 0.049 | 0.057 | 0.067 | 0.073 | 0.076 | 0.083 | 0.087 | 0.080 | 0.082 | 0.080 |
| 100 | 0.053 | 0.058 | 0.070 | 0.076 | 0.079 | 0.082 | 0.084 | 0.088 | 0.083 | 0.081 |
| 125 | 0.066 | 0.066 | 0.075 | 0.083 | 0.083 | 0.081 | 0.082 | 0.089 | 0.081 | 0.083 |
| 150 | 0.091 | 0.082 | 0.084 | 0.087 | 0.086 | 0.079 | 0.080 | 0.080 | 0.080 | 0.085 |
| Moldability* | ◎ | ◎ | ◎ | ◎ | ○ | ○ | ○ | ◎ | ◎ | ◎ |

*Moldability:
◎ Good moldability (Good appearance)
○ Moldable to a functional component

TABLE 3

| Resin Tq | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| (A) 50° C. | | | | 0 | | | 5 | 5 | |
| (E) 80° C. | | 60 | | | 48 | | | | |
| (F) 100° C. | | | 60 | | | 48 | | | |
| (B) 160° C. | | | | | | | | 75 | |
| (C) 220° C. | 100 | 40 | 40 | 80 | 32 | 32 | 75 | 50 | |
| Elastomer (VS-1: solid) | | | | 10 | 10 | 10 | 10 | 10 | 25 |
| Other elastomer (solid part) | | | | | | | | | |
| PS | | | | | | | | | |
| Styrene monomer | | | | 10 | 10 | 10 | 10 | 10 | 25 |
| Filler | 120 | 120 | 120 | 120 | 120 | 120 | 120 | 120 | 120 |
| GF | 30 wt % | 30 wt % | 30 wt % | 30 wt % | 30 wt % | 30 wt % | 30 wt % | 30 wt % | 30 wt % |
| 0 | 0.018 | 0.028 | 0.024 | 0.022 | 0.030 | 0.027 | 0.022 | 0.022 | 0.019 |
| 25 | 0.022 | 0.035 | 0.029 | 0.025 | 0.041 | 0.034 | 0.027 | 0.029 | 0.041 |
| 50 | 0.025 | 0.043 | 0.033 | 0.030 | 0.046 | 0.035 | 0.032 | 0.034 | 0.045 |
| 75 | 0.028 | 0.061 | 0.039 | 0.031 | 0.060 | 0.042 | 0.038 | 0.038 | 0.052 |
| 100 | 0.029 | 0.075 | 0.060 | 0.032 | 0.074 | 0.057 | 0.041 | 0.042 | 0.045 |
| 125 | 0.031 | 0.074 | 0.081 | 0.035 | 0.075 | 0.080 | 0.045 | 0.056 | 0.047 |
| 150 | 0.038 | 0.076 | 0.094 | 0.040 | 0.076 | 0.095 | 0.048 | 0.084 | 0.049 |
| Moldability* | ◎ | ◎ | ◎ | ◎ | ◎ | ◎ | ◎ | ◎ | ○ |

*Moldability:
◎ Good moldability (Good appearance)
○ Moldable to a functional component In Tables 1 to 3, the unit of blending formulation is expressed by part by weight and the unsaturated polyester resins contain respective parts by weight of styrene shown in Synthesis Examples. Further, VS-1 designates polystyrene-vinyl-polyisoprene tri-block copolymer (VS-1/glass transition temperature: 25° C.) manufactured by Kuraray Co., Ltd.; PS designates polystyrene resin (Polymar 9965/glass transition temperature: 100° C.) manufactured by Takeda Chemical Ind., Ltd.; PVAc designates polyvinyl acetate resin (Polymar 9966/glass transition temperature: 45° C.) manufactured by Takeda Chemical Ind. , Ltd.; and SP designates saturated polyester resin (TTK310/glass transition temperature: −25° C.) manufactured by Takemoto Yushi Co., Ltd. The polystyrene, polyvinyl acetate, and saturated polyester are supplied as a resin whose solvent is styrene. However, in order to make clear the amount of a solid part, the solid part and styrene were described separately in the Tables. Further, the filler used is aluminum oxide powder.

Figure 2:
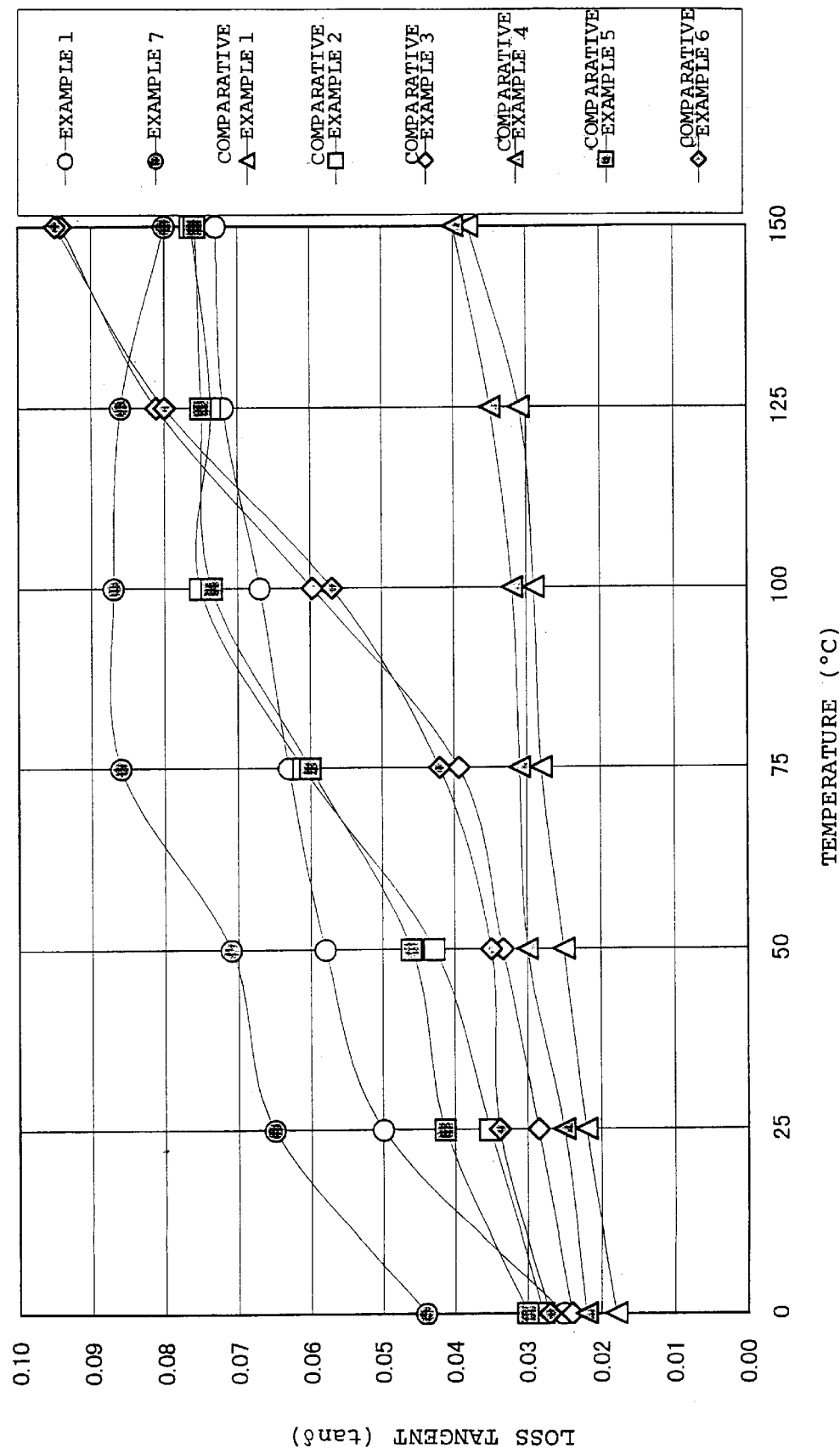
FIG. 2 is a drawing illustrating the effect of blending an unsaturated polyester resin (A) having a low glass transition temperature with the elastomer (D).

From Tables 1 to 3, it can be seen that comparing Example 1 relating to the resin composition which was blended with the unsaturated polyester resin (A) having a low glass transition temperature (50° C.) with Comparative Example 1 not blended with the unsaturated polyester resin (A), Comparative Example 2 (blended with a resin of Tg=80+ C.), and Comparative Example 3 (blended with a resin of Tg=100° C.), as shown in FIG. 1, Comparative Examples 1 to 3 show low loss tangents (tanδ), particularly at 25 to 75° C., i.e., these show low vibration-damping properties in this environmental temperature range. On the contrary, it is apparent that Example 1 shows excellent vibration-damping properties at a broad temperature range of 25° C. or more. Further, upon comparing Example 1, Example 7 and Example 18 with Comparative Examples 1 to 6 (FIG. 2), Example 7, which corresponds to Example 1 blended with an elastomer having a glass transition temperature of −50° C. or more and less than 100° C., has vibration-damping properties far superior to those of Example 1 in a broad temperature range of from 0 to 150° C. On the other hand, Comparative Examples 1 to 3, and Comparative Examples 4 to 6, which correspond to Comparative Examples 1 to 3, respectively blended with the elastomer (D) having a glass transition temperature of 25° C., generally exhibit lower vibration-damping properties than Example 7, and although Comparative Examples 4 to 6 also show some improvement in vibration-damping properties by blending the elastomer (D) having a glass transition temperature of 25° C., the effect is slight at those blending ratios. From this it follows that, as can be seen by comparison between Examples 1 and 7, the combined use of the unsaturated polyester resin (A) and the elastomer (D) having a glass transition temperature of −50° C. or more and less than 100° C. is effective to the improvement of vibration-damping properties.

Figure 3:
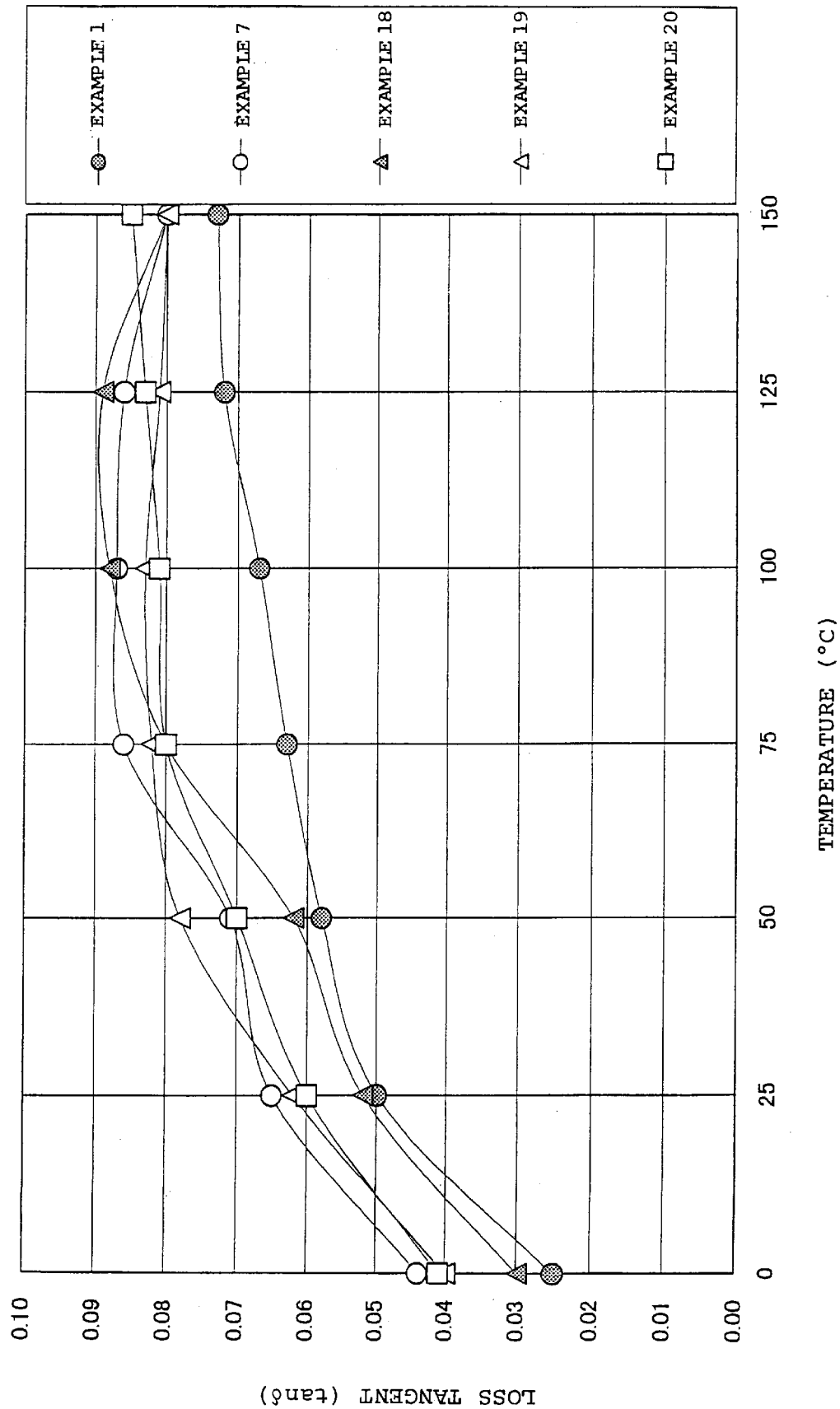
FIG. 3 is a drawing illustrating the effect of blending an unsaturated polyester resin (A) having a low glass transition temperature with another elastomer (D).

Similarly, Examples 19 and 20 in which elastomers having a glass transition temperatures of 45° C. (polyvinyl acetate) and −25° C. (saturated polyester) were blended, respectively, exhibit very excellent vibration-damping properties compared with Example 1 in a broad temperature range, whereas Example 18, which corresponds to Example 1 blended with a polystyrene having a glass transition temperature of 100° C., shows improvement in vibration-damping properties to the same extent as Example 7 in the higher temperature range but in the lower temperature range, the improvement is on the same order as Example 1 (FIG. 3), and hence the effect of improving vibration-damping properties in a broad temperature range is evident by replacing the elastomer to be blended together with the unsaturated polyester resin (A) by the elastomer (D) of the present invention.

Figure 4:
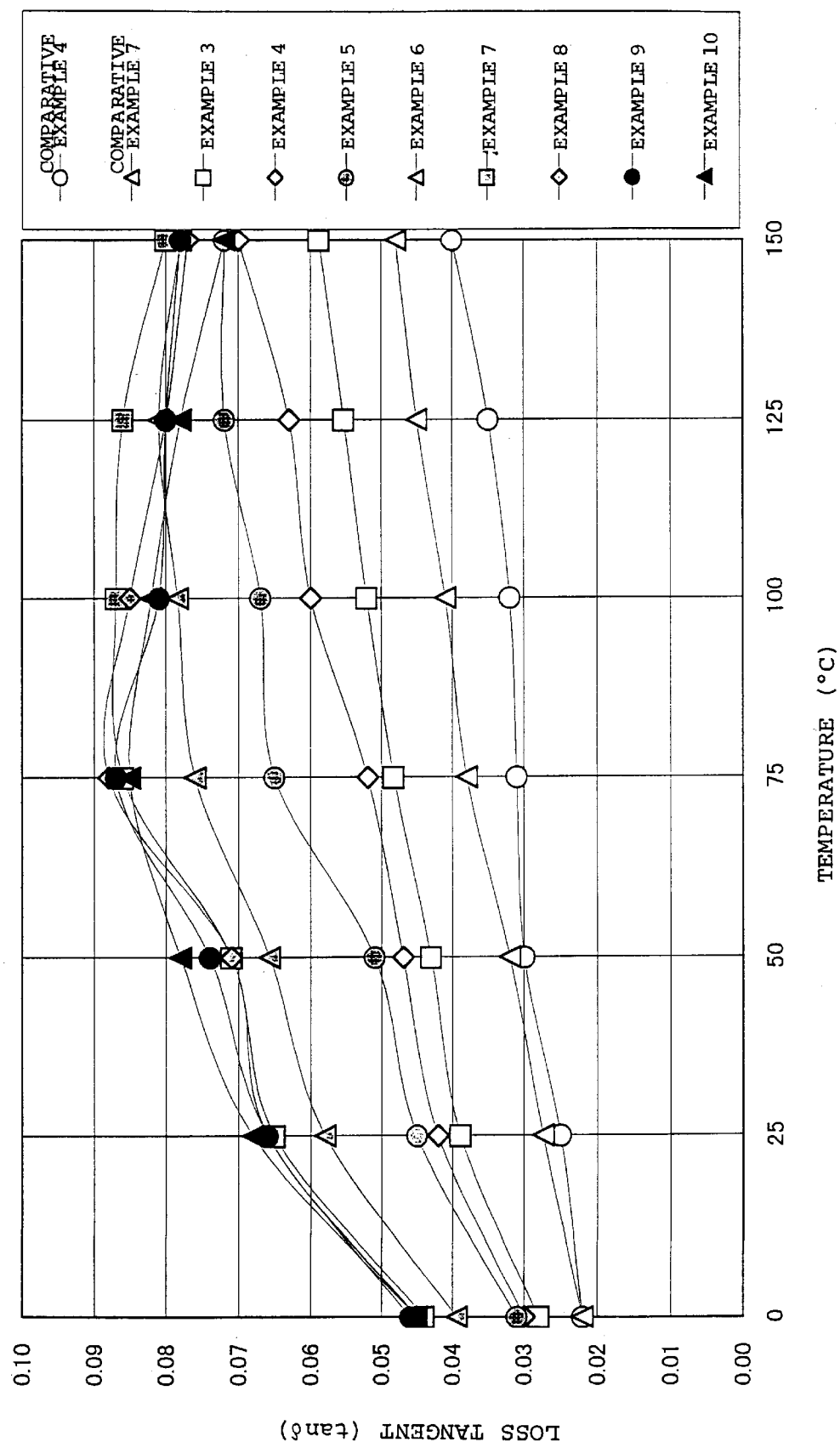
FIG. 4 is a drawing illustrating the influence of blending ratio of an unsaturated polyester resin (A) having a low glass transition temperature.
Figure 5:
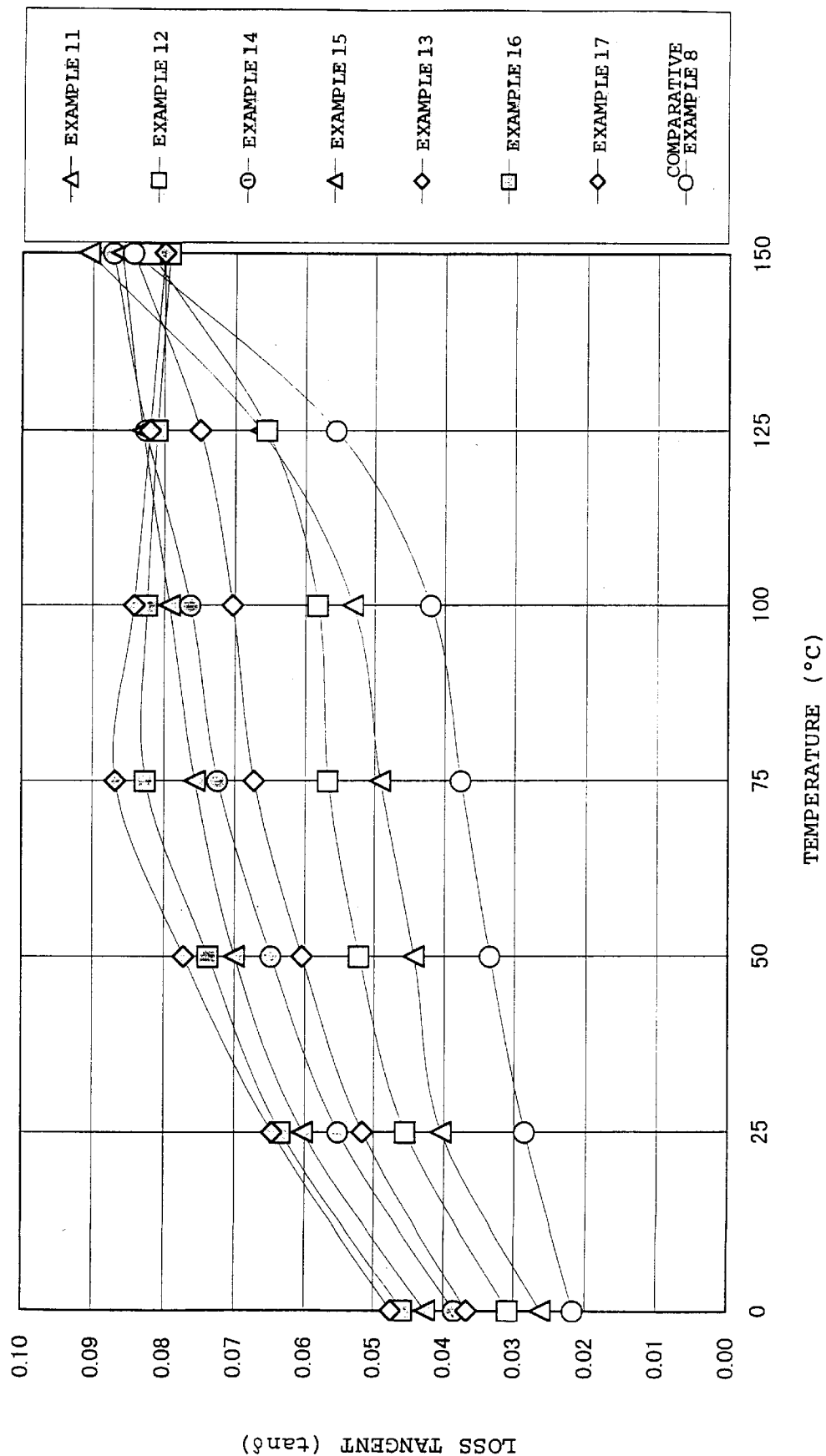
FIG. 5 is a drawing illustrating the influence of blending ratio of an unsaturated polyester resin (A) having a low glass transition temperature.

From Examples 3 to 10 (FIG. 4) and Examples 11 to 17 (FIG. 5), it can be seen that although the more the unsaturated polyester resin (A) is blended, the more the vibration-damping properties at 100° C. or less are improved, an increase in blending ratio results in reduction in a rate of improvement of vibration-damping properties and also in deterioration of moldability.

From the above, in the present invention, selection of the above-described blending ratios is preferred in order to obtain resin compositions having more excellent vibration-damping properties and moldability simultaneously. Further, it can be seen that even when the unsaturated polyester resin (C) having a Tg of 200° C. or more is used and the proportion of the unsaturated polyester resin (A) is made relatively larger, resin compositions whose moldability is not deteriorated and which have more excellent vibration-damping properties can be obtained.

The unsaturated polyester resin composition and a molded article obtained by molding a molding material comprising the resin composition impregnated on glass fiber are excellent in heat resistance and chemical resistance and have excellent vibration-damping properties and moldability so that they are very useful, for example, as automobile engine-related components.

What is claimed is:

1. An unsaturated polyester resin composition having excellent vibration-damping properties and moldability, comprising:

an unsaturated polyester resin (A) having a glass transition temperature (Tg) of 0° C. or more and less than 60° C., and an unsaturated polyester resin (B) having a glass transition temperature (Tg) of 150° C. or more and less than 200° C., wherein said composition comprises 10% by weight or more and less than 90% by weight of unsaturated polyesters (a) of the unsaturated polyester resin (A) and 10% by weight or more and less than 90% by weight of unsaturated polyesters (b) of the unsaturated polyester resin (B), based on the total weight of unsaturated polyesters (a) and (b) of the unsaturated polyester resins (A) and (B), and wherein said composition optionally contains a vinyl monomer as a diluent.

2. An unsaturated polyester resin composition having excellent vibration-damping properties and moldability, comprising:

an unsaturated polyester resin (A) having a glass transition temperature (Tg) of 0° C. or more and less than 60° C., and an unsaturated polyester resin (C) having a glass transition temperature (Tg) of 200° C. or more, wherein said composition comprises 10% by weight or more and less than 95% by weight of unsaturated polyesters (a) of the unsaturated polyester resin (A) and 5% by weight or more and less than 90% by weight of unsaturated polyesters (c) of the unsaturated polyester resin (C), based on the total weight of unsaturated polyesters (a) and (c) of the unsaturated polyester resins (A) and (C), and wherein said composition optionally contains a vinyl monomer as a diluent.

3. An unsaturated polyester resin composition having excellent vibration-damping properties and moldability, which comprises:

10 to 95% by weight of an unsaturated polyester resin composition X, comprising the unsaturated polyester resin composition according to claim 1, 0 to 80% by weight of an inorganic filler, and 5 to 70% by weight of a reinforcing fiber.

4. An unsaturated polyester resin composition having excellent vibration-damping properties and moldability, which comprises:

10 to 95% by weight of an unsaturated polyester resin composition X, comprising the unsaturated polyester resin composition according to claim 2, 0 to 80% by weight of an inorganic filler, and 5 to 70% by weight of a reinforcing fiber.

5. A molded article obtained by molding an unsaturated polyester resin composition X comprising the unsaturated polyester resin composition according to claim 1.

6. A molded article obtained by molding an unsaturated polyester resin composition X comprising the unsaturated polyester resin composition according to claim 2.

7. A molded article obtained by molding the unsaturated polyester resin composition according to claim 3.

8. A molded article obtained by molding the unsaturated polyester resin composition according to claim 4.

9. An unsaturated polyester resin composition having excellent vibration-damping properties and moldability, comprising:

an unsaturated polyester resin (A) having a glass transition (Tg) of 0° C. or more and less than 60° C., and an unsaturated polyester resin (B) having a glass transition temperature (Tg) of 150° C. or more and less than 200° C., wherein said composition comprises 10% by weight or more and less than 90% by weight of unsaturated polyesters (a) of the unsaturated polyester resin (A) and 10% by weight or more and less than 90% by weight of unsaturated polyesters (b) of the unsaturated polyester resin (B), based on the total weight of unsaturated polyesters (a) and (b) of the unsaturated polyester resins (A) and (B), wherein said composition optionally contains a vinyl monomer as a diluent, and wherein said composition further contains 3 to 30% by weight a solid part of an elastomer (D) having a glass transition temperature (Tg) of −50° C. or more and less than 100° C., based on the total weight of a mixture of the unsaturated polyester resins, elastomer, and optional vinyl monomer.

10. An unsaturated polyester resin composition having excellent vibration-damping properties and moldability, comprising:

an unsaturated polyester resin (A) having a glass transition temperature (Tg) of 0° C. or more and less than 60° C., and an unsaturated polyester resin (C) having a glass transition temperature (Tg) of 200° C. or more, wherein said composition comprises 10% by weight or more and less than 95% by weight of unsaturated polyesters (a) of the unsaturated polyester resin (A) and 5% by weight or more and less than 90% by weight of unsaturated polyesters (c) of the unsaturated polyester resin (C), based on the total weight of unsaturated polyesters (a) and (c) of the unsaturated polyester resins (A) and (C), wherein said composition optionally contains a vinyl monomer as a diluent, and wherein said composition further contains 3 to 30% by weight a solid part of an elastomer (D) having a glass transition temperature (Tg) of −50° C. or more and less than 100° C., based on the total weight of a mixture of the unsaturated polyester resins, elastomer, and optional vinyl monomer.

11. An unsaturated polyester resin composition having excellent vibration-damping properties and moldability, which comprises:

10 to 95% by weight of an unsaturated polyester resin composition X, comprising the unsaturated polyester resin composition according to claim 9, 0 to 80% by weight of an inorganic filler, and 5 to 70% by weight of a reinforcing fiber.

12. An unsaturated polyester resin composition having excellent vibration-damping properties and moldability, which comprises:

10 to 95% by weight of an unsaturated polyester resin composition X, comprising the unsaturated polyester resin composition according to claim 10, 0 to 80% by weight of an inorganic filler, and 5 to 70% by weight of a reinforcing fiber.

13. A molded article obtained by molding an unsaturated polyester resin composition X, comprising the unsaturated polyester resin composition according to claim 9.

14. A molded article obtained by molding an unsaturated polyester resin composition X, comprising the unsaturated polyester resin composition according to claim 10.

15. A molded article obtained by molding the unsaturated polyester resin composition according to claim 11.

16. A molded article obtained by molding the unsaturated polyester resin composition according to claim 12.

* * * * *